(12) United States Patent
Doll et al.

(10) Patent No.: US 6,382,314 B1
(45) Date of Patent: May 7, 2002

(54) HEAT EXCHANGER MADE OF PLASTIC AND METHOD FOR ITS MANUFACTURE AS WELL AS AN AIR CONDITIONING UNIT

(75) Inventors: Theo Doll, Schwaigern; Oskar Goetz, Zaberfeld, both of (DE)

(73) Assignees: Soehner Kunststofftechnik GmbH, Schwaigern; Goetz Heizsysteme GmbH, Zaberfeld, both of (DE)

( * ) Notice: Subject to any disclaimer, the term of this patent is extended or adjusted under 35 U.S.C. 154(b) by 0 days.

(21) Appl. No.: 09/360,157

(22) Filed: Jul. 26, 1999

(30) Foreign Application Priority Data

Jul. 24, 1998 (DE) ......................................... 198 33 366

(51) Int. Cl.⁷ ................................................ F28D 9/00
(52) U.S. Cl. ........................................ 165/164; 165/165
(58) Field of Search ............................. 165/164 B, 165, 165/54, 238, 244, 247

(56) References Cited

U.S. PATENT DOCUMENTS

| | | | |
|---|---|---|---|
| 3,451,388 A | * 6/1969 | Eck | 165/147 |
| 4,582,130 A | * 4/1986 | Modschiedler | 165/165 |
| 4,653,574 A | * 3/1987 | Quinlisk et al. | 165/54 |
| 4,793,407 A | * 12/1988 | Baumann | 165/165 |
| 5,008,803 A | * 4/1991 | Katsumi | 165/246 |
| 5,024,263 A | * 6/1991 | Laine et al. | 165/54 |
| 5,036,906 A | * 8/1991 | Rylewski | 165/54 |
| 5,468,449 A | * 11/1995 | Sjogren et al. | 165/165 |

FOREIGN PATENT DOCUMENTS

| | | | |
|---|---|---|---|
| DE | 39 12 628 A1 | 10/1990 | |
| DE | 39 12 628 | 10/1990 | |
| DE | 3912628 | * 10/1990 | |
| DE | 196 18 328 | 5/1996 | |
| EP | 320279 | * 10/1929 | ................. 165/165 |
| EP | 0 121 163 | 3/1984 | |
| EP | 0 197 169 | 10/1986 | |
| EP | 0 414 231 | 2/1991 | |
| EP | 0787953 | * 8/1997 | |
| EP | 0 787 953 | 8/1997 | |
| FR | 1155978 | * 5/1958 | ................. 165/165 |
| FR | 2510245 | * 1/1983 | ................. 165/165 |

* cited by examiner

Primary Examiner—Henry Bennett
Assistant Examiner—Tho V Duong
(74) Attorney, Agent, or Firm—Crowell & Moring LLP

(57) ABSTRACT

A heat exchanger made of plastic has flow channels for guiding two fluids countercurrently. The heat exchanger includes a cover part; an intermediate layer that at least partially forms the flow channels; and a trough part. The intermediate layer comprises (1) a flow channel for a first fluid comprising channel sections that are spaced apart from one another and (2) a second flow channel comprising opposite flow sections on back of the channel sections for a second fluid guided in an opposite direction from the first fluid. The wall areas that separate the channel sections and opposite flow sections are heat transfer membranes. The cover part and the trough part are connected tightly with the intermediate part, and the intermediate layer is a single piece. The heat exchanger can be used for room ventilation with heat recovery or air conditioning.

18 Claims, 7 Drawing Sheets

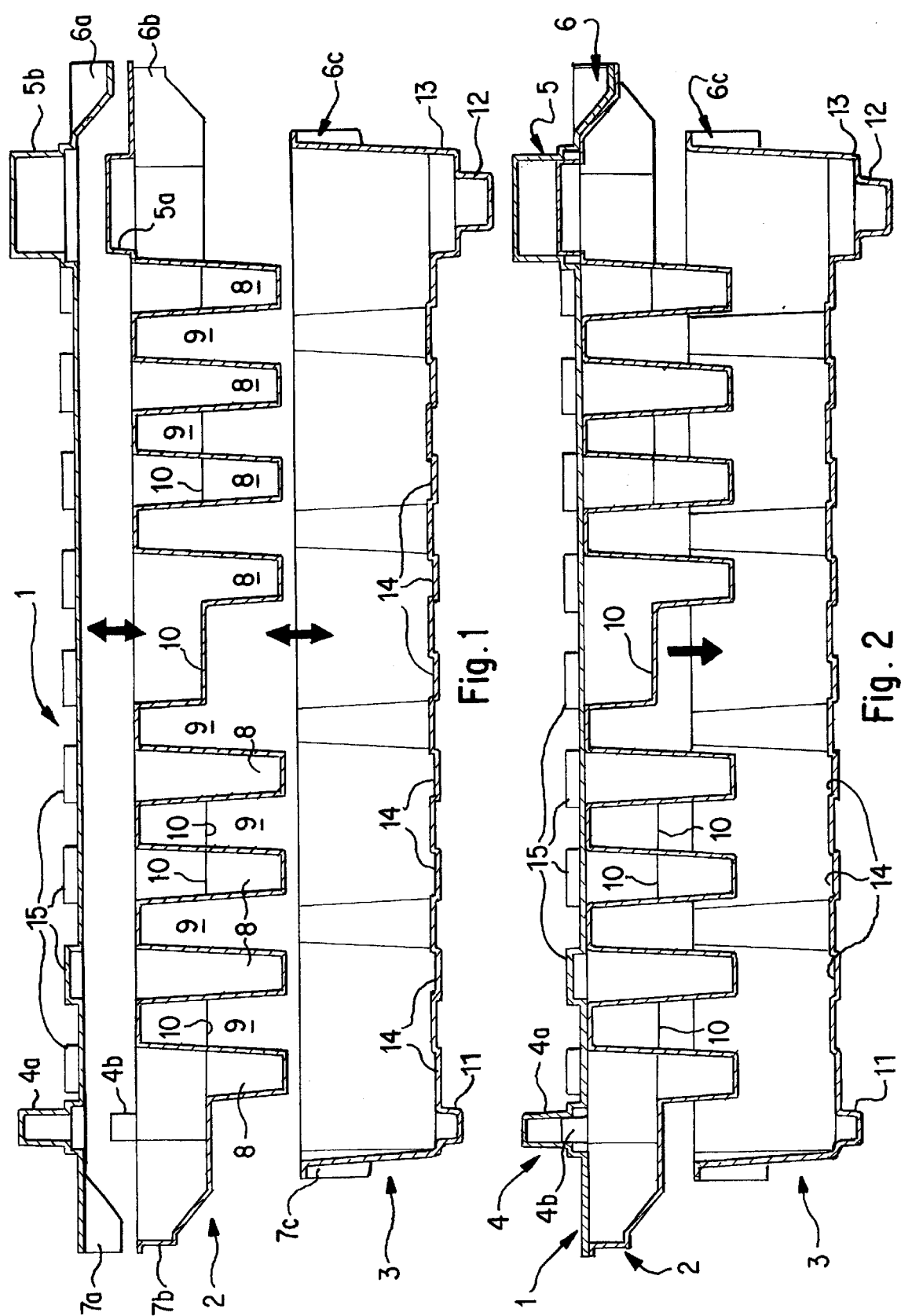

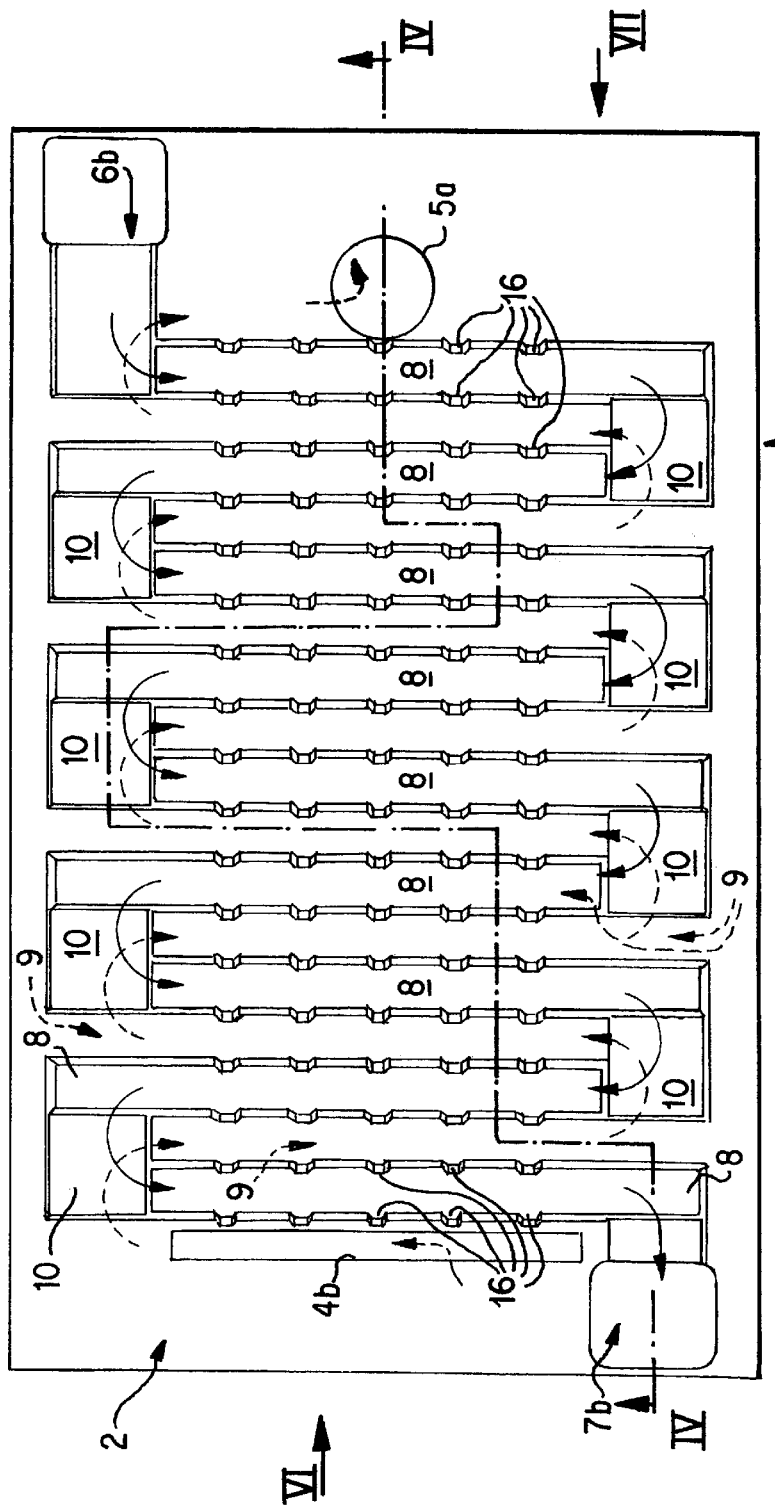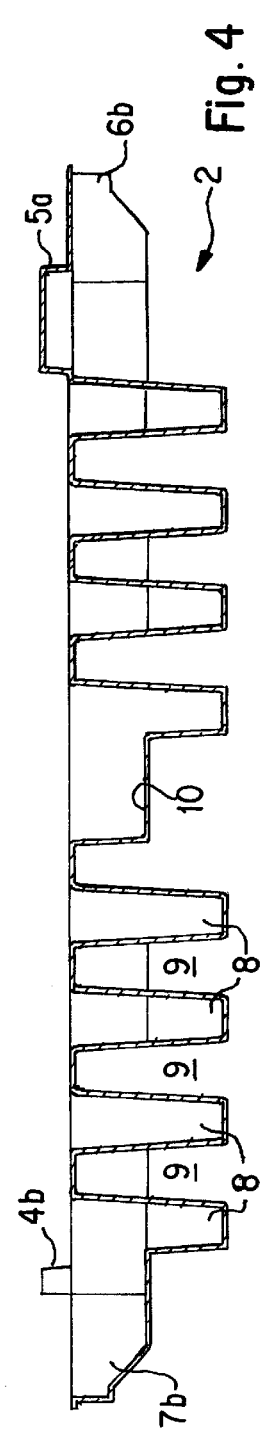

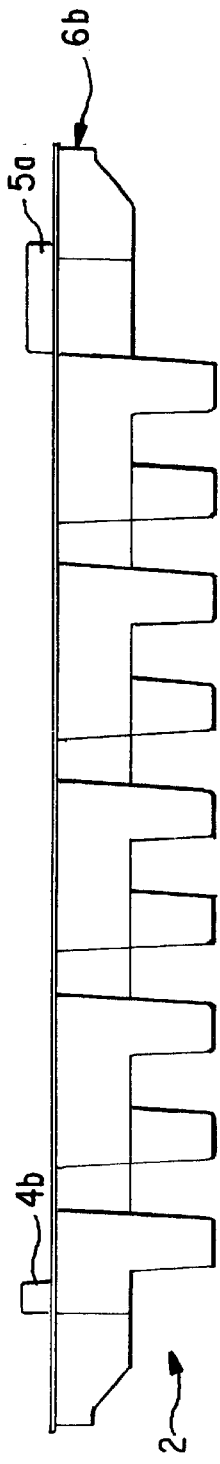
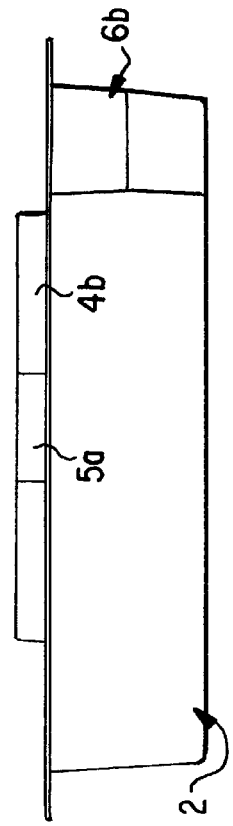
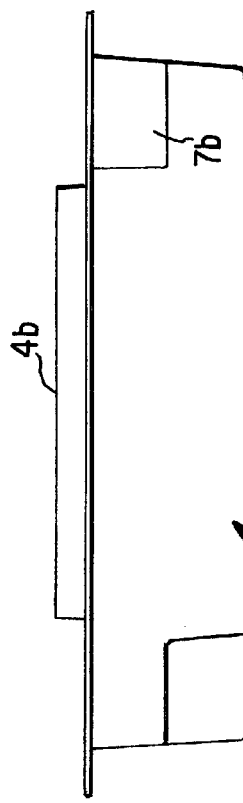
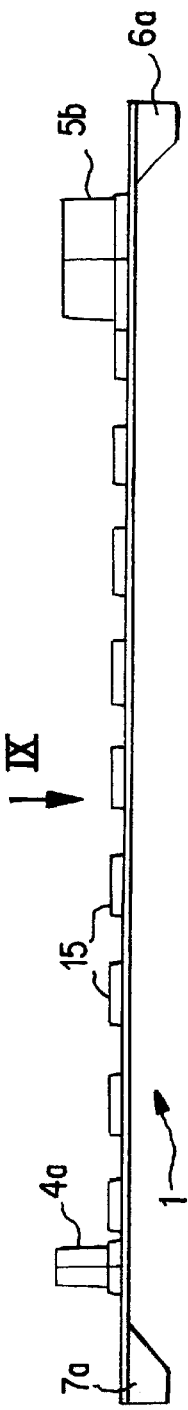

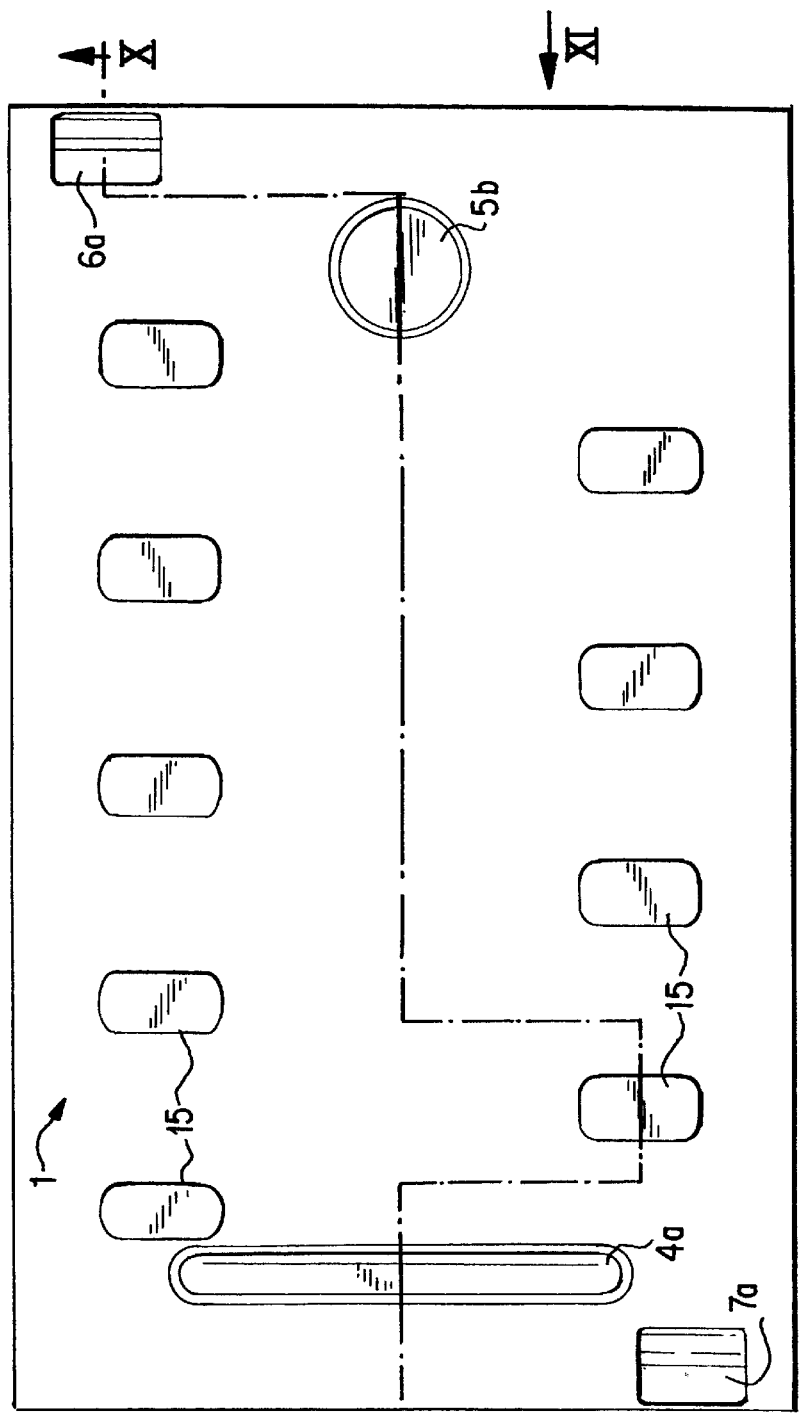
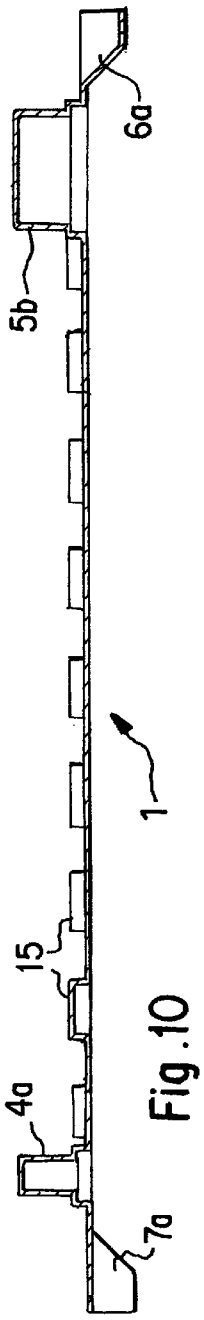
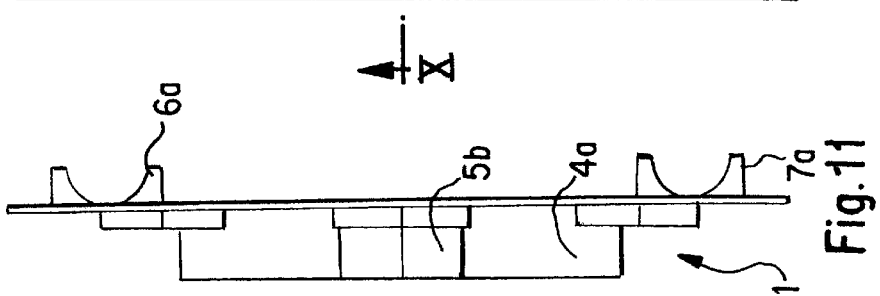
Fig. 9
Fig. 10
Fig. 11

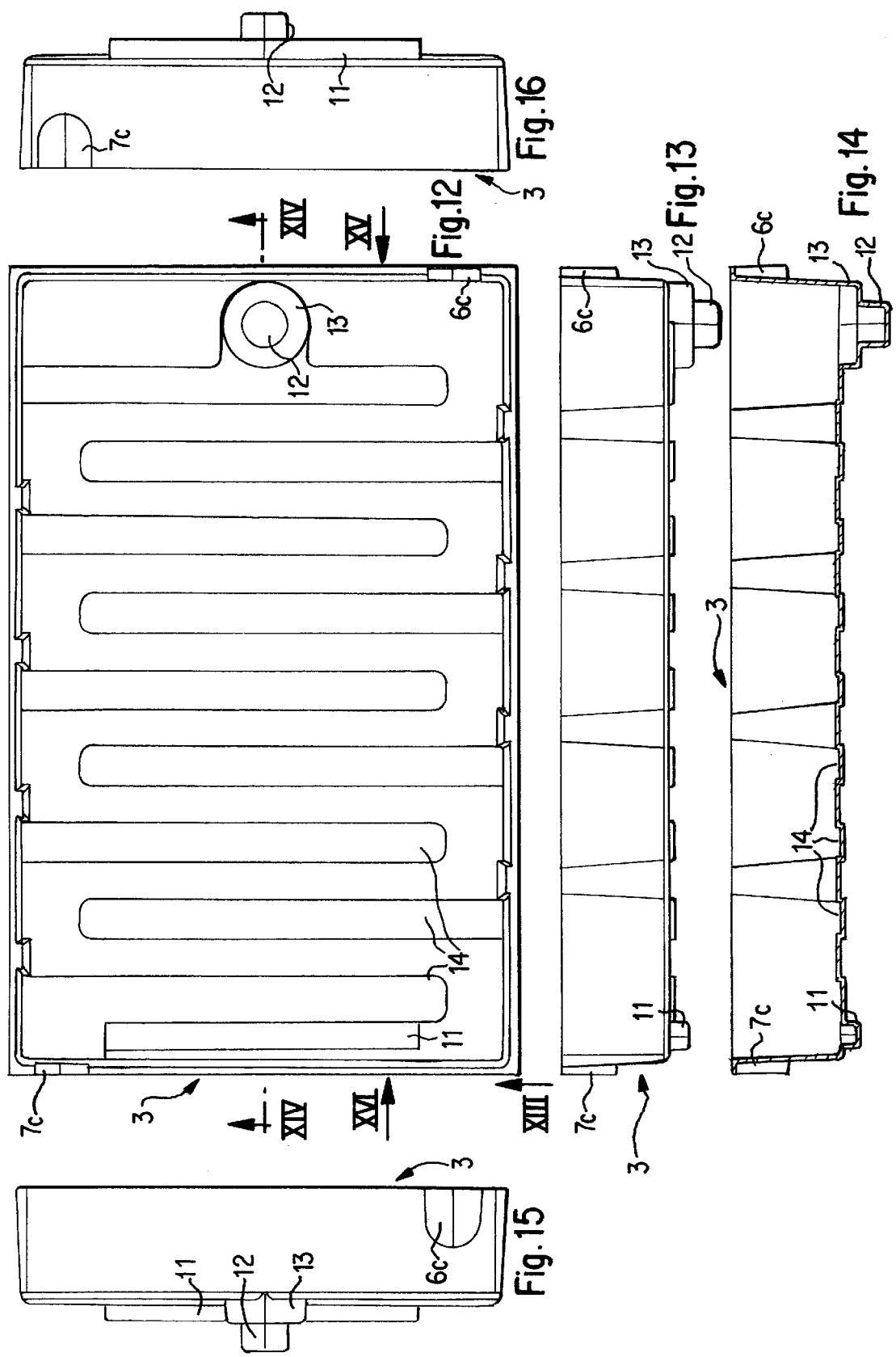

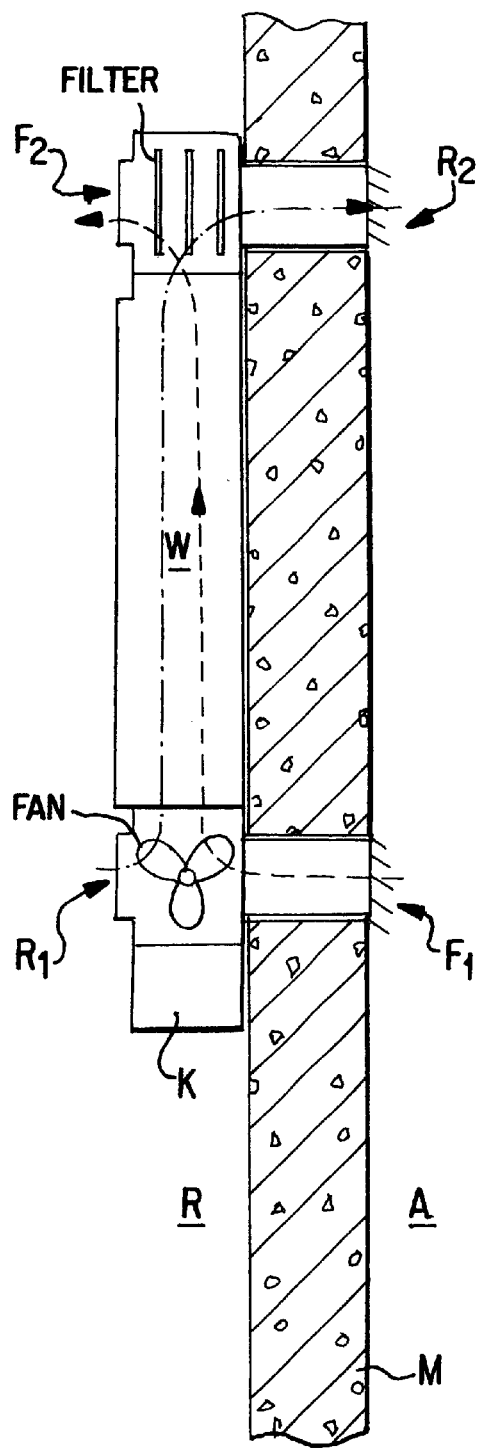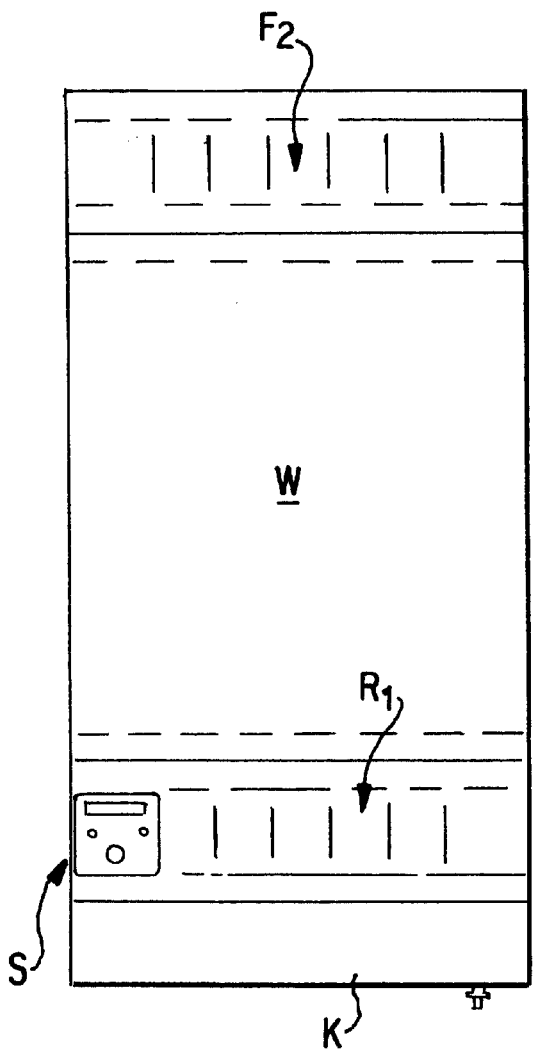
Fig. 17
Fig. 18

HEAT EXCHANGER MADE OF PLASTIC AND METHOD FOR ITS MANUFACTURE AS WELL AS AN AIR CONDITIONING UNIT

BACKGROUND AND SUMMARY OF THE INVENTION

This application claims the priority of German Patent Application No. 198 33 366.8, filed Jul. 24, 1998, the disclosure of which is expressly incorporated by reference herein.

The present invention relates to a heat exchanger made of plastic having flow channels for guiding two fluids using the countercurrent principle, as well as a method for its manufacture and an air conditioning unit.

A heat exchanger made of a thin-walled plastic material is known from DE 39 12 628 A1, in which the heat exchanger consists of three elements separable from one another and using the countercurrent principle.

It is known from a brochure, "Pro Condens" from Götz Heizsysteme GmbH, to provide a plastic heat exchanger associated with a steel heating boiler. The plastic heat exchanger operates using the countercurrent principle, with fresh air drawn in by the heating burner flowing in one direction and the hot exhaust gas flowing in the other direction. The fresh air supplied to the heating burner is thus already preheated. At the same time, the exhaust gas is cooled and partially condensed. The structure of the plastic heat exchanger is not described in this brochure.

The object of the present invention is to provide a heat exchanger that ensures a simple and functionally reliable transfer of heat.

This object is achieved by virtue of the fact that the exchanger is made in three parts, namely a cover part, an intermediate layer that at least partially forms the flow channels, and a trough part, with the intermediate layer being made in one piece and provided with flow sections, spaced apart from one another and open at a front, of the flow channel for the first fluid in such fashion that the opposite sections remaining between the channel sections automatically form the flow channel of the second fluid guided in the opposite direction, with the wall areas separating the channel sections and opposite sections being designed as heat transfer membranes, and that the cover part and the trough part are connected with the intermediate layer tightly in such fashion that the flow channels and opposite sections are combined to form the flow channels for the two fluids. The term "fluid" according to the present invention refers to both gases and liquids.

As a result, in simple fashion, by means of only a single intermediate layer, the arrangement of one flow channel and an appropriately opposed flow channel is created. The channel sections are designed as heat transfer membranes such that the wall areas between the channel sections and the opposite sections permit sufficient heat transfer between the fluids flowing in opposite directions. This heat transfer function can be produced by appropriate thinness of the walls, by the use of additional membranes, and/or by suitable flow guides such as turbulence elements or the like. The heat transfer membranes can also be formed by appropriate profiles so that the adjacent fluids have sufficient time for the respective heat transfer through the wall areas. Preferably, the flow channels are guided meanderwise or in zigzag fashion so that the flow sections or channel sections are each located between the other channel sections or opposite sections. The closed flow channels on both sides are produced by the respective tight connection of the cover part and the trough part.

In an embodiment of the present invention, the intermediate layer is designed as a deep-drawn part and the wall areas are deep-drawn thin walls such that there is a sufficient heat transfer between the fluids as they flow countercurrently. This is an especially simple design of a heat transfer membrane.

In another embodiment of the present invention, the cover part and the intermediate layer are manufactured jointly in a twinsheet method. This is an especially simple and sturdy type of manufacturing that ensures a high rigidity of the heat exchanger and a tight connection between the cover part and the intermediate layer. In the twinsheet method, two plastic plates, in this case the plates for the cover part and intermediate layer, are thermally shaped jointly by deep drawing and then thermoset in the desired shape.

In another embodiment of the present invention, the wall areas are provided with turbulence profiles. Heat transfer is further improved as a result.

For good heat insulation and transfer, the cover part, the intermediate layer, and the trough part are dark in color, preferably black.

In another embodiment of the present invention, the channel sections and the correspondingly designed opposite sections are each guided zigzag-wise, thereby producing U-shaped reversing areas as a result. This is an especially advantageous design of the channel sections and the opposite sections, since a considerable length of the flow channels and therefore a large heat transfer area is produced on a comparatively small surface. Good heat transfer also permits a compact design.

In another embodiment of the present invention, the flow channels in the vicinity of the reversing areas have at least the same flow cross sections as in the vicinity of the associated channel or opposite sections. As a result, at least largely constant flow pressure conditions are achieved for both flow channels, thus guaranteeing reliable and functionally safe operation of the heat exchanger.

In another embodiment of the present invention, the cover part and/or the trough part are releasably connected with the intermediate layer. This makes it possible to remove impurities from inside the heat exchanger. Especially advantageously, the intermediate layer can be separated from the trough part, since condensate and impurities in the condensate collect in the trough part and can be removed in simple fashion from time to time.

In another embodiment of the present invention, the cover part and trough part are shaped relative to one another in such fashion that two or more three-part heat exchanger units can be stacked on top of one another. This is especially advantageous if the heat exchanger is subjected to high flow volumes or greater temperature differences between the fluids which could not be sufficiently modified by a single unit. Stacking several heat exchanger units makes it possible to produce a compact design of the resultant total heat exchanger with improved heat transfer.

In another embodiment of the present invention, the connecting openings in the cover part and in the trough part are shaped to correspond to one another in such fashion that with at least two heat exchanger units stacked on top of one another, the corresponding connecting openings of the cover part and adjacent trough part can be inserted into one another. Additional connections between the heat exchanger units on top of one another are thus avoided.

Air conditioning units formed by decentralized ventilation systems including heat recovery for residences and businesses are generally known. However, in addition to a large amount of space, these also require a high installation cost.

Another object of the present invention is thus to create an air conditioning unit for enclosed spaces, especially residences and businesses, which can function with the lowest possible installation cost.

This object is achieved according to the present invention by an air conditioning unit for enclosed spaces that has (1) an air intake associated with a first connection of the room interior with an outside environment; (2) an air outlet spaced apart from the air intake which is associated with a second connection of the room interior to an outside environment; and (3) a fan arrangement associated with the air intake and/or the air outlet. Both the air intake and the air outlet are connected to a heat exchanger according to the present invention.

As a result, using the heat exchanger according to the present invention, it is possible to provide, in a simple manner, room ventilation with heat recovery and air conditioning as a function of the outside and inside climatic conditions. By using the countercurrent heat exchanger, an extremely low installation cost is required since the corresponding heat exchanger can be positioned directly in the vicinity of a wall of the respective room and requires only a matching number of passages through the wall to the outside. In addition to heat recovery in cold seasons, use of the heat exchangers in air cooling systems is especially advantageous. In this case, the room air expelled to the outside, with corresponding ventilation and already cooled by the air conditioning system, can serve to precool the warm outside air from the environment as it flows in on the intake side. As a result, considerable energy savings are realized since the incoming outside air has already undergone a certain amount of pre-cooling in the heat exchanger by transferring heat to the outgoing room air.

In designing this invention, the fan arrangement can be operated by a control or regulating unit. The control or regulating unit may contain open loop control units, closed loop control units, and feed-back control units. As a result, the air intake and air exhaust for the respective room can be controlled. Preferably, the regulating unit has at least one actual-value sensor located in the air intake and/or exhaust whose signals can be compared with at least one set-point adjuster, and the fan arrangement can be controlled as a function of the result of this comparison. The at least one actual-value sensor is designed especially for temperature, humidity, and carbon dioxide content determination in the incoming and/or outgoing air. Preferably the set-point adjuster is part of a microprocessor unit to which a plurality of actual-value sensors for different types of data acquisition can be connected. By using a basically known volume flow measurement, depending on the corresponding parameters, the air volume can be regulated and extremely uniform energy-saving room air conditioning can be performed.

In another embodiment of the present invention, a filter arrangement is associated with the air intake. This can consist of a simple protective grid for keeping out coarse dirt and insects; a nonwoven grating with electrostatic properties for binding dust and pollen; an activated charcoal filter for trapping harmful gases and aerosols; or even a high-voltage filter composed of capacitor plates charged to approximately 10 kV for trapping very fine dust and bacteria. Preferably, the filter arrangement is located replaceably in a housing of the heat exchanger. As a result, the filter inserts can preferably be removed by appropriate plug connections and cleaned or replaced.

Other objects, advantages and novel features of the present invention will become apparent from the following detailed description of the invention when considered in conjunction with the accompanying drawings.

BRIEF DESCRIPTION OF THE DRAWINGS

FIG. 1 shows, in a lengthwise section and in an exploded view, an embodiment of a heat exchanger according to the present invention;

FIG. 2 shows the heat exchanger in another exploded view similar to FIG. 1, with the cover part and intermediate layer assembled;

FIG. 3 is a top view of the intermediate layer according to FIGS. 1 and 2;

FIG. 4 is a lengthwise section through the intermediate layer along line IV—IV in FIG. 3;

FIG. 5 is a side view of the intermediate layer in the direction of arrow V in FIG. 3;

FIG. 6 is a first end view of the intermediate layer in the direction of arrow VI in FIG. 3;

FIG. 7 is an opposite end view of the intermediate layer in the direction of arrow VII in FIG. 3;

FIG. 8 is a side view of the cover part according to FIGS. 1 and 2;

FIG. 9 is a top view of the cover part in the direction of arrow IX in FIG. 8;

FIG. 10 is a lengthwise section along line X—X in FIG. 9;

FIG. 11 is an end view of the cover part in the direction of arrow XI in FIG. 9;

FIG. 12 is a top view of the trough part according to FIGS. 1 and 2;

FIG. 13 is a side view of the trough part in the direction of arrow XIII in FIG. 12;

FIG. 14 is a lengthwise section through the trough part along section line XIV—XIV in FIG. 12;

FIG. 15 is a first end view of the trough part in the direction of arrow XV in FIG. 12;

FIG. 16 is an opposite end view of the trough part in one direction of arrow XVI in FIG. 12.

FIG. 17 is a section through an outside wall of a building on whose interior one embodiment of an air conditioning unit according to the present invention is mounted, and FIG. 18 is a front view of the air conditioning unit according to FIG. 17;

DETAILED DESCRIPTION OF THE DRAWINGS

Figure 19:
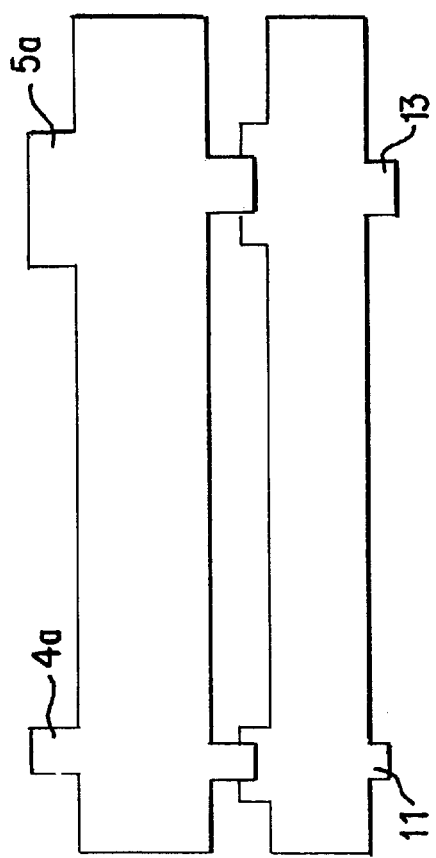
FIG. 19 is a schematic view of a plurality of stacked heat exchangers according to the present invention.
Figure 20:
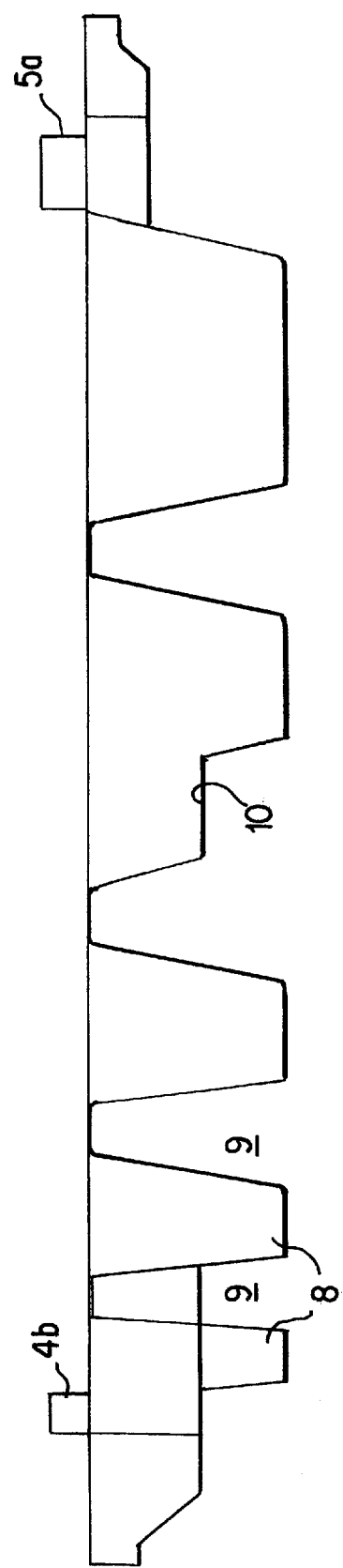
FIG. 20 is a schematic view of the flow cross section of the channel sections and opposite sections being adjusted to volume changes of the fluids.

A heat exchanger according to FIGS. 1 to 16 is made of plastic and is used for heating or air conditioning buildings. The heat exchanger is associated in a manner not shown in greater detail with a heating burner of a heating circuit. The heat exchanger is designed as a countercurrent heat exchanger, with fresh air being supplied to the heating burner as a first fluid in one flow channel arrangement and being warmed in heat exchanger and with exhaust gas, for example flue gas, being guided in the corresponding countercurrent guide from the burner through the heat exchanger and cooled. However, the present invention is not limited to this combination of fresh air and flue gas, but can be provided similarly for countercurrent guidance of other fluids.

The heat exchanger is composed of three plastic parts: a cover part 1; an intermediate layer 2; and a trough part 3. Cover part 1 and intermediate layer 2 are manufactured in a common twinsheet method wherein, in a basically known fashion, two plastic plates at a time are jointly deep-drawn in suitable devices and then thermoset. Trough part 3 can be produced by a simple deep-drawing method.

Intermediate layer 2 constitutes the actual functional part of the heat exchanger. The intermediate layer 2 is deep-drawn such that by suitable profiling, parallel channel sections 8 as well as parallel domed ribs located between them are obtained, which form opposite sections 9. Channel sections 8 and opposite sections 9 have the same free flow cross sections, wherein opposite sections 9 form the matching negative shapes for channel sections 8 and are open on a lower side. Channel sections 8 on the other hand are open on an upper side. Both channel sections 8 and opposite sections 9 are connected with one another by zigzag reversing areas 10, forming U-shaped reversing corner areas. In the top view, the reversing areas 10 are made square, so that they have a depth that is equal to half the depth of a channel sections 8 or opposite sections 9. The width of each reversing area 10 corresponds to twice the width of channel section 8 and opposite section 9. In the reversing areas 10, both on the side of the channel sections 8 referred to as the front and on the side of the opposite sections 9 referred to as the back, approximately the same flow cross sections are obtained in the areas of channel sections 8 or opposite sections 9 as in the respective reversing areas 10.

The flow channel produced by channel sections 8 and the corresponding upper reversing areas 10 as well as by the closely fitting cover part 1 is indicated by the solid arrow running zigzag-wise in FIG. 3. The flow channel located on the underside, formed by the opposite sections 9 as well as the matching undersides of return areas 10 and by the close fit of trough part 3, is indicated by the dashed arrows. The flow channel indicated by the solid arrows serves to guide fresh air and the flow channel on the underside serves to guide flue gas. A fresh-air intake is located in intake area 6b, and a fresh air outlet is located in outlet area 7b. A flue gas inlet is provided at the level of slot-shaped ribs 4b and a flue gas outlet is provided at an outlet stub 5a. Fresh air inlet 6 as well as fresh air outlet 7 as well as the flue gas inlet 4a, 4b and the flue gas outlet 5a, 5b are not defined exclusively by the corresponding profiles in the intermediate layer 2, but also by matching profiles in cover part 1 and trough part 3. To allow flue gas to enter and escape, matching domed or channel-shaped forms 4a, 5b are provided in cover part 1 that are mounted on the corresponding profiles 4b, 5a on intermediate layer 2 (FIG. 2). Fresh air inlet 6 and fresh air outlet 7 are formed by corresponding shapes 6a, 6b, 6c and 7a, 7b, 7c which together each form a tool connecting stub.

All three parts (i.e., cover part 1, intermediate layer 2, and trough part 3) are produced by deep drawing. Cover part 1 and intermediate layer 2 are deep-drawn jointly by a twinsheet method, so that the tight connection in FIG. 2 between cover part 1 and intermediate layer 2 is produced in one workstep. The domed ribs 4a, 4b in the vicinity of flue gas inlet 4 also project into one another shapewise in the vicinity of flue gas outlet 5. The surfaces of intermediate layer 2 are connected materialwise with one another, especially in the vicinity of the opposite sections 9 with the underside of cover part 1 by the twinsheet process. In addition, the marginal area of intermediate layer 2 and of cover part 1 are connected tightly with one another all the way round, so that a closed flow channel is obtained for the fresh air. In the vicinity of the reversing area 10, elevations 15 are provided in cover part 1 that also smooth out the flow in the flow channel for the fresh air. Thus, elevations 15 supplement the shapes of reversing areas 10, so that at least largely identical flow cross sections are obtained jointly in all areas of the flow channel.

Trough part 3 is produced by simple deep drawing and on its walls has rib profiles not described in greater detail which taper toward its upper edge and serve to stiffen the walls of trough part 3. In the bottom of trough part 3, on the side that is on the left in FIG. 2 (see also FIGS. 12 to 14) a groove-shaped form 11 is provided that matches to the flue gas inlet 4a of cover part 1 and intermediate layer 2. This shape 11 is provided for cases in which a plurality of heat exchanger units are stacked on top of one another and operated in parallel. Shape 11 thus constitutes a flue gas connection. The same is true of the domed form 13 on the opposite side of the bottom of trough part 3. This matches flue gas outlet 5a and likewise serves as a flue gas connection with a parallel arrangement of at least two heat exchangers as shown in FIGS. 1 and 2. Shape 13 is joined by a stepped domed shape 12 at the bottom which constitutes a condensate drain in case only a single heat exchanger is provided or when this heat exchanger is the bottom heat exchanger in a stack of heat exchangers. Depending on the requirement, the condensate drain is provided with a corresponding connection or the flue gas connection 13 is provided, in which the condensate drain 12 is removed in simple fashion.

Trough part 3 is connected releasably with the twinsheet unit (made of cover part 1 and intermediate layer 2), with screw connections being distributed around the circumference of the heat exchanger for releasable connection. However, other releasable connecting means may be used. In addition, trough part 3 and twinsheet unit can be glued together all round at the upper marginal area of trough part 3 to produce a sufficient seal between trough part 3 and twinsheet unit. This gluing however is performed such that the parts are not damaged when the twinsheet unit is separated from trough part 3.

The bottom of trough part 3 is also provided in the vicinity of channel sections 8 with flat groove-shaped depressions 14 which, in the assembled state of the heat exchanger, are positioned just below channel sections 8. During the operation of the heat exchanger, condensate from the flue gas being conducted accumulates in these depressions 14 and seals off trough part 3 from the respective bottoms of channel sections 8. An additional tight connection formed materialwise or otherwise is thus avoided between the channel sections of intermediate layer 2 and the bottom of trough part 3 so that the condensate formation located in depressions 14 improves the zigzag-wise guidance of the flue gas by opposite sections 9.

The wall areas that run diagonally downward or upward between the adjacent channel sections 8 and opposite sections 9 are made with relatively thin walls in order to achieve good heat transfer between the fluids flowing in opposite directions. In addition, the wall areas are provided with turbulence profiles 16 (FIG. 3) that ensure a turbulent flow of the fluids in the two flow channels. The turbulence profiles 16 are made in the form of ribs and run vertically inside the respective wall areas between the wall sections 8 and the opposite sections 9.

The releasable connection between trough part 3 and twinsheet unit (FIG. 2) makes it possible to clean trough part 3 from time to time as required and especially to remove deposits of the condensate formation.

In an embodiment of the present invention that is not shown, the flow cross sections of the flow channels are adjusted over their entire length as a function of temperature to volume changes in the area to be heated or cooled in such fashion that in each case homogeneous flow conditions prevail throughout.

An air cooling or conditioning unit for admitting air to and removing it from a residential or business area is positioned on a building wall M that separates the residential or business area R from an outside environment A (FIG. 17). The core of the air conditioning unit is a heat exchanger W that corresponds to the exchanger in the embodiment according to FIGS. 1 to 16 in terms of its structure and function. Heat exchanger W is vertically mounted on the building wall M on the room side, in other words on the inside, and is provided at both top and bottom with a wall adapter. Both wall adapters have an air guide stub passing through the building wall M, with an air flap grating provided on the outside. The lower air guide stub serves as a fresh air intake $F_1$ for fresh air guided into area R ($F_2$) from the outside environment A. The outer air guide stub serves as an air outlet $R_2$ for the air removed from area R ($R_1$).

In order to achieve controlled admission and removal of air, the air conditioning unit is associated in a manner not shown in greater detail with at least one fan which is preferably located in one of the two wall adapters and either draws in fresh air or blows room air into the outside environment A. Instead of a single fan, separate fans can be associated with air intake and exhaust. The upper wall adapter has a fresh air intake $F_2$ directed inward toward room R. Appropriately reversed, the lower wall adapter has a room air outlet $R_1$. The room air intakes $R_1$ and $R_2$ as well as fresh air intakes $F_1$ and $F_2$ are connected with one another by the countercurrent heat exchanger W as indicated schematically by the dashed and dot-dashed lines, so that heat transfer takes place within heat exchanger W between the incoming outside air and the room air flowing out. A filter arrangement is associated with fresh air intake $F_1$ or $F_2$ which optionally can be designed as a simple protective grid, a nonwoven grid with electrostatic properties, an activated charcoal filter, or a high-voltage filter.

In order to produce exact regulation of ventilation and aeration, an electronic control system S (FIG. 18) is also associated with the air conditioning unit which in particular controls the fans as a function of measurements of appropriate air status components such as temperature, humidity, carbon dioxide content, and the like. Air volume can also be regulated by means of volume flow measurement.

A condensate tank is located on an underside of the air conditioning unit, from which tank the condensate that accumulates in the heat exchanger as well as in the wall adapters can be drained.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A heat exchanger made of plastic that has first and second flow channels for respectively guiding first and second fluids countercurrently, comprising:
   (A) a cover part;
   (B) an intermediate layer that at least partially forms the flow channels, said intermediate layer comprising:
      (1) a first flow channel for the first fluid comprising channel sections that are spaced apart from one another,
      (2) a second flow channel comprising opposite flow sections on back of the channel sections that guide the second fluid in an opposite direction from the first fluid, and
      (3) a plurality of U-shaped reversing areas, each comprising an upper section through which the first fluid flows from the channel sections and a separate bottom section on back of the upper section through which the second fluid flows from the opposite flow sections,
      wherein wall areas that separate the channel sections and opposite flow sections are heat transfer membranes and wherein the channel sections and the opposite flow sections are in a zigzag manner; and
   (C) a trough part,
   wherein the cover part and the trough part are connected tightly with the intermediate part, and wherein the intermediate layer is a single piece.

2. A heat exchanger according to claim 1, wherein the intermediate layer is a deep-drawn part having deep-drawn, thin wall areas for heat transfer between the first and second fluids.

3. A heat exchanger according to claim 1, wherein the cover part and intermediate layer are manufactured jointly by a twinsheet process.

4. A heat exchanger according to claim 1, wherein the wall areas comprise turbulence profiles.

5. A heat exchanger according to claim 1, wherein the cover part, the intermediate layer, and the trough part have a dark color.

6. A heat exchanger according to claim 5, wherein at least one of the cover part, the intermediate layer, and the trough part are black.

7. A heat exchanger according to claim 1, wherein the channel sections have at least largely the same flow cross section in the vicinity of the U-shaped reversing areas as the opposite flow sections.

8. A heat exchanger according to claim 7, wherein the flow cross section of the channel sections and the opposite flow sections are adjusted to volume changes due to heating or cooling of the first and second fluids so that homogeneous flow conditions are achieved over the length of the channel sections and the opposite flow sections.

9. A heat exchanger according to claim 1, wherein at least one of the cover part and the trough part are releasably connected with the intermediate layer.

10. A heat exchanger according to claim 1, further comprising connecting openings in the cover part and the trough part for feeding and exhausting the channel sections and the opposite flow sections.

11. A heat exchanger according to claim 1, wherein the cover part and the trough part have matching shapes such that a plurality of heat exchangers can be stacked on top of one another.

12. A heat exchanger according to claim 1, wherein the trough part is provided at its bottom with depressions arranged such that in the vicinity of deep-drawn channel sections, they are located beneath channel sections in the assembled state of the heat exchanger.

13. A heat exchanger according to claim 1, wherein a height of the U-shaped reversing areas is half a height of the corresponding channel sections or opposite flow sections.

14. A heat exchanger according to claim 1, wherein a width of the U-shaped reversing areas is twice a width of the corresponding channel sections or opposite flow sections.

15. A heat exchanger according to claim 1, wherein the U-shaped reversing areas have a square configuration.

16. A heat exchanger according to claim 1, wherein the intermediate layer has a rectangular configuration with two long sides and two short sides.

17. A heat exchanger according to claim 16, wherein a plurality of the U-shaped reversing areas are located laterally along each of the long sides of the intermediate layer.

18. A heat exchanger according to claim 1, wherein the plurality of U-shaped reversing areas are common to both the channel sections and the opposite flow sections.

* * * * *